United States Patent Office 2,877,254
Patented Mar. 10, 1959

2,877,254

PROCESS FOR PREPARING ORGANO-HALOSILANES

Eduard Enk and Siegfried Nitzsche, Burghausen, Upper Bavaria, Germany, assignors to Wacker-Chemie G. m. b. H., Munich, Bavaria, Germany No Drawing. Application September 15, 1955
Serial No. 534,624

Claims priority, application Germany September 25, 1954

6 Claims. (Cl. 260—448.2)

The subject of the present invention is an improved method of preparing organohalosilanes by reacting halohydrocarbons with silicon.

The "direct process" for producing organohalosilanes by the reaction of a halohydrocarbon with silicon is very well known in the art. The reaction is illustrated, for example, in the series of U. S. patents from No. 2,380,995 to 2,381,002 and in U. S. Patent No. 2,488,487. In general, the reaction is carried out at a temperature of from 200° to 550° C. Various metal catalysts, particularly copper and silver, and metal halides such as copper chloride have been added to the silicon to give improved results. Ferrosilicon (preferably containing less than 25% by weight iron) has been a conventional source of silicon in the reaction. Copper-silicon and copper-iron-silicon alloys have been used to provide the desired copper catalyst.

The use of a hydrogen halide, preferably HCl, in conjunction with the halohydrocarbon reactant has also been advocated for superior results. The amount of hydrogen halide used is ordinarily up to about 50% by volume of the total of any gaseous reactants employed.

The halohydrocarbons employed in the "direct process" reaction are amply described in the literature. Ordinarily the alkyl halides, particularly the chlorides, are of the most commercial interest. $CH_3Cl$, $C_2H_5Br$, and $C_3H_7Cl$ exemplify such reactants. Aryl halides such as bromo- and chlorobenzene are also used. $CH_3Cl$ is the most commercially important reactant at the present time.

In the present invention, it is to be understood that any of the conventional practices such as those described above can be incorporated into the improved process which is described and claimed.

In the preparation of organohalosilanes from the reaction of silicon and, e. g., alkyl chloride or aryl chloride, preferably MeCl, one is particularly interested in a high proportion of organo- disubstituted halosilanes, such as $Me_2SiCl_2$, in the crude silane. (The symbol "Me" is used herein as the $CH_3$ radical.) This problem is the subject of numerous publications but has not yet been satisfactorily solved. Considerable progress has been made in this field, but the methods still suffer from technical complexity or excessive cost. Moreover, disturbances and irregularities occur which apparently are attributable to the properties of silicon.

There are known methods which start from finely ground mixtures of metallic silicon and copper or bronze powder, which, if desired, have been previously sintered. In these methods, a decisive role is played by the purity of the silicon, which must be at least 99% pure, by the type of copper powder, and by the fineness of the powder. Technical development has shown that good conversions and yields are attainable on this basis and the proportion, e. g., of $Me_2SiCl_2$, is satisfactory. On the other hand, however, these methods still have several disadvantages, which are particularly revealed when carrying out the reaction. Moreover the costs are still quite high: 99% pure silicon is considerably more expensive than, e. g., ferrosilicon containing 90% Si; copper powder is likewise considerably more expensive than copper in pieces. The grinding apparatus required for the hard silicon is subjected to great wear, particularly if very fine particle sizes are demanded, and finally the recommended sintering process or the suggested pretreatment of the silicon-copper mixture with hydrogen likewise add considerably to the costs of this method.

By using alloys of silicon with heavy metals instead of silicon, many of the aforementioned difficulties have been considerably alleviated. It is particularly significant that it is possible to fuse, e. g., 90% ferrosilicon with 5 to 20% copper to form alloys which need not be finely ground and which at the same time lead to good conversions and better space-time-yields. However, upon operating on a larger scale, it was revealed that the $Me_2SiCl_2$ content of the crude silane is dependent upon certain prerequisites, which were not immediately evident and which required greater attention in carrying out the reaction. Moreover, greater demands are made on the operating personnel if good results are to be obtained. Occasionally the $Me_2SiCl_2$ content of the crude silane sank so low, when only 30% of the silicon charge had been consumed, that the reaction had to be interrupted if the total crude silane was to have a $Me_2SiCl_2$ content of over 50%. All these difficulties did not always occur but only with certain charges even though the production of the silicon and its reaction with halohydrocarbons appeared to be identical.

The solution of the problem was found in the surprising discovery that organohalosilanes are produced very satisfactorily if halohydrocarbons are reacted with a silicon material in which the aluminum content is not more than 0.2% by weight, preferably 0.1 to 0.02%, and in which the calcium content is less than 0.10% by weight. This discovery is of particular interest because other investigators had determined that the presence of aluminum was not detrimental, that at the most it increased the yield of $Me_3SiCl$. All the more unexpected is the discovery that aluminum contents above 0.2% further the formation of $MeSiCl_3$ and those below 0.2% further the formation of $Me_2SiCl_2$. The yields of $Me_2SiCl_2$ must be considered in relation to the reaction time, the amount of silicon consumed and the amount of crude silane obtained. Naturally it is desirable to obtain the highest possible yield in the shortest possible time, based on the amount of the silicon charge which is consumed. The same improvement apparently holds true for the preparation of other organic disubstituted halosilanes, such as dialkyl- and diaryldichlorosilanes.

Heretofore in commercial processes, the yield of organic disubstituted chlorosilanes has amounted on the average to about 40% of the crude silane mixture, and large amounts of organotrichlorosilanes were formed. 100 parts reactant silicon yielded about 80 parts crude silane mixture, or e. g. based on the reactant MeCl, 100 parts of the latter yielded 15 to 20 parts $Me_2SiCl_2$.

According to the present invention the yields, e. g. of $Me_2SiCl_2$, can be increased from 30 to 40% to about 60 to 70% of the crude silane mixture or, based on 100 parts of silicon raw material, from 80 to about 130 to 200 parts and, based on 100 parts methylchloride raw material, from 15 to 20 to about 45 to 60 parts.

The aluminum and, if necessary, the calcium content of the silicon employed herein may be lowered in any desired way, i. e. all suitable methods of preparation and purification can be utilized. Particularly good results are obtained in the production of organohalosilanes if the reaction, if desired in the presence of admixed or alloyed heavy metals and additional activators, utilizes a silicon material which has been prepared or after-treated with the aid of magnesium or suitable magnesium compounds. Slag-forming substances, such as $SiO_2$ or silicates, are preferably added, which then form a fluid slag with the compounds of magnesium and aluminum and/or calcium.

Such a refining process produces a silicon material of increased purity, from which the disturbing metals have been removed to the point that unexpectedly they no longer influence the reaction in a negative sense.

Magnesium compounds, especially magnesium oxide, can simply be added to the usual starting mixtures for the production of silicon by the electrothermal reduction of quartz, so that upon tapping the undesirable impurities are drawn off with the fluid slag. Usually, however, the silicon material should be further purified by reacting magnesium or compounds thereof with molten silicon (which can itself be prepared by any method) in the presence of $SiO_2$ or silicates, and removing the impurities with the slag. The molten silicon is reacted, e. g., with magnesium oxide or magnesium in the presence of small amounts of silica (in the preferred ratio of 1 mol Mg to about 1 to 1.5 mol $SiO_2$) or the silicon can be reacted with magnesium silicate. The amount of magnesium or compounds thereof and slag additives depends on the form and size of the reaction furnace. Internal stirring of the melt with the purifying slag should be provided for.

If, for example, quartz consisting of 98% $SiO_2$, 1.2% $Al_2O_3$, 0.5% $Fe_2O_3$ and 0.3% CaO, $TiO_2$ and alkali oxide, is reduced with a mixture of coke and charcoal in an electrothermal furnace in known ways, there is obtained a silicon containing 97.4% Si, 1.3% Al, 0.7% Fe and 0.5% Ca as well as small amounts of C and Ti. On the other hand if 3% MgO, based on the amount of quartz used, is added to the aforementioned raw material mixture, there is obtained a silicon containing 98.6% Si, 0.8% Fe, 0.3% Ca and only 0.2% Al as well as small amounts of C and Ti. If quartz is reduced in the presence of iron or another heavy metal, the addition of MgO yields a correspondingly pure silicon alloy. If a quartz-coke mixture is reduced in the usual way, e. g. in the presence of about 12% iron filings based on the weight of the quartz, there is obtained an approximately 75% pure ferrosilicon containing about 1% Al and 0.4% Ca. However, if the reduction is carried out in the presence of MgO, the aluminum content is decreased below 0.2% and that of calcium to below 0.3%. On the other hand if quartz is reduced in the presence of about 5% Cu based on the weight of the quartz, there is formed a copper silicide containing about 10% Cu, about 1% Al and about 0.5% Ca. In this case also if about 3% MgO is added the silicon alloy likewise contains less than 0.2% Al and less than 0.3% Ca.

These relatively pure silicon products are often of sufficient purity to use directly in the present invention. If not, it can be seen that the impurity is so slight that the silicon can easily be further purified by reacting it with magnesium silicate, $Mg+SiO_2$, or $MgO+SiO_2$ in the described manner.

Good results are obtained if magnesium or compounds thereof are added to crude silicon instead of to the quartz reduction process. For example, if molten silicon consisting of 95.7% Si, 1.8% Fe, 1.4% Al and 1.0% Ca is treated with a melt of magnesium silicate, or with magnesium or magnesium oxide in the presence of $SiO_2$, the aluminum content sinks below 0.1% and that of calcium below 0.05%. Identical results are obtained by fusing silicon alloys, e. g. such as iron or copper alloys, with magnesium silicate. In all of these cases, part of the magnesium silicate (added or formed from magnesium oxide or magnesium and quartz) reacts with aluminum to form magnesium aluminum silicate and the calcium to form calcium aluminum silicate or calcium silicate. All of these compounds go into the slag which is drawn off from the purified silicon. Surprisingly enough the magnesium aluminum silicates are not reduced even at the high temperature of the electric furnace.

It is remarkable that iron has no disturbing effect on the reaction of silicon with halohydrocarbons and just as little effect on the after-treatment of the melt so that the starting materials used can be of the cheapest quality. This is a very surprising and important fact because it is known that reactions such as the direct process production of silanes are extremely sensitive and even traces of metals, e. g. lead and antimony, cause complete cessation of the reaction.

In this way one has a wide choice of quartz raw materials and their corresponding preparation so that no special starting materials are required. Thus for example ordinary 90% ferrosilicon or ordinary quartz and sand, as well as ordinary coal, can be used as starting materials. The inventive method is very satisfactory from an economic stand-point not only with respect to the purity of the raw materials but also because of the elimination of the expensive grinding step. Heretofore particularly fine comminution down to particle sizes with a diameter of 40 to 100 millimicrons and also a certain quality of the granulation (conditions which can be fulfilled only with greatest expense) have been put forward as particularly favorable. These conditions can be completely avoided by using the silicon raw materials on which the invention is based. In the new method the raw materials react just as well if the comminution is carried out in an ordinary hammer mill or in a crusher. It makes no difference if pieces the size of hazelnuts are present in addition to small particles. Even in cases in which there are present only particles which are between 1 and 3 mm., i. e. no finely ground particles, the reaction takes place with no difficulty.

Heretofore numerous decomposition products of the halohydrocarbons were present in the vent gases of the reaction furnace. For example when using methylchloride they amount to 50 to 70% of the excess methylchloride. When operating according to the invention, these decomposition products amount to at the most 1 to 5%. Heretofore the MeCl content of the vent gases decreased with reaction time and the content of decomposition products increased, whereby at the most 50% methylchloride remained undecomposed in the vent gases. When operating according to the inventive method, the MeCl content amounts to 95% and remains approximately constant during the reaction time.

The inventive method can be carried out particularly advantageously if halohydrocarbons are reacted with a silicon containing certain amounts of copper, e. g. within the range of 3 to 20% (preferably about 10% and if desired also iron, e. g. in amounts of up to 25% and preferably about 5 to 7%. Preferably the reaction is carried out in the presence of activators such as cuprous chloride, iron chloride or other suitable metal salts.

The following examples are illustrative only. All percentages given are by weight.

*Example 1*

For the reaction of methylchloride with silicon, a furnace is charged with 220 kg. silicon, containing about 87% Si, 3% Fe, 10% Cu, less than 0.2% Al and about 0.08% Ca in a particle size of 1 to 3 mm. About 15% cuprous chloride is added as an activator. At a temperature of 300 to 305° C., the reaction begins with the addition of MeCl, the flow of which initially is 5 cubic meters per hour and is regulated according to the formation of silane. In 107 hours, 640 kg. silane is formed, which contains 65% $Me_2SiCl_2$. Even if the reaction is interrupted, i. e. after the above-mentioned silane is formed, the $Me_2SiCl_2$ content is much greater than 50%. The reactant silicon at this point is up to 70% converted, and the hourly production has fallen to 2 kg. per hour crude silane. This corresponds to a point at which only 65 kg. silicon remains unconsumed. It is recommended to stop the reaction at this point for economic reasons.

A further advantage of the method shows up at this point in that it is possible to recharge the furnace without removing the residue. The reaction then proceeds in the same satisfactory manner as in the case of the initial charging. In comparison, if one uses a silicon material which is not within the defined limitation of purity, it is necessary to remove the residue, for it has a negative effect on the production of $Me_2SiCl_2$ and large amounts of $MeSiCl_3$ are formed. This shows that by means of this invention, production of silane halides can be carried out continuously, because the remaining residue does not have a detrimental effect. The silicon material is then almost completely utilized.

*Example 2*

For the conversion of MeCl to $Me_2SiCl_2$, a silicon is used which is prepared as follows: to a molten ferrosilicon which contains 3% Fe, 1.4% Al and 1% Ca is added 10% copper, based on the weight of the silicon. This is then treated either with a melt of magnesium silicate which contains 1 atom magnesium per 1.2 molecules $SiO_2$ or with magnesium in the presence of corresponding amounts of $SiO_2$. After removing the slag, the aluminum content of the melt decreases below 0.1%, the calcium content below 0.05%.

1000 g. of the so-prepared silicon are reacted with 1900 g. methyl chloride as in Example 1. There is formed 2.2 kg. methylchlorosilanes, containing 1.2 kg. $Me_2SiCl_2$ (corresponding to a yield of about 60%).

*Example 3*

When $C_2H_5Cl$ or $C_6H_5Cl$ is employed as the halohydrocarbon reactant in the method of Example 1, an improvement in the yield of diethyldichlorosilane or phenylchlorosilanes is obtained as compared to the use of conventional silicon reactants.

That which is claimed is:

1. In the process for the production of organohalosilanes by the reaction of a halohydrocarbon with silicon, the improvement which comprises employing silicon which has been pretreated by mixing the silicon in the molten state with a slag-producing material selected from the group consisting of magnesium silicate, a mixture of magnesium and silica, and a mixture of magnesium oxide and silica, and removing the calcium and aluminum impurities in the formed slag, said pretreatment being carried out to the extent that the resulting purified silicon contains a maximum of up to 0.2 percent aluminum and less than 0.1 percent by weight calcium.

2. The method of obtaining improved yields of $$(CH_3)_2SiCl_2$$

from the reaction of $CH_3Cl$ and silicon at a temperature range of from 200° to 550° C., which comprises contacting the $CH_3Cl$ in said temperature range with silicon which has been pretreated by mixing the silicon in the molten state with a slag-producing material selected from the group consisting of magnesium silicate, a mixture of magnesium and silica, and a mixture of magnesium oxide and silica, and removing the calcium and aluminum impurities in the formed slag, said pretreatment being carried out to the extent that the resulting purified silicon contains a maximum of up to 0.2 percent aluminum and less than 0.1 percent by weight calcium.

3. A method in accordance with claim 2 wherein after the pretreatment of silicon and prior to the reaction with $CH_3Cl$, the silicon is mixed with an activator for the reaction of $CH_3Cl$ and silicon.

4. A method in accordance with claim 2 wherein after the pretreatment of silicon and prior to the reaction with $CH_3Cl$, the silicon is mixed with up to 20 percent by weight of copper based on the weight of the silicon.

5. A method in accordance with claim 2 wherein after the pretreatment of silicon and prior to the reaction with $CH_3Cl$, the silicon is mixed with up to 25 percent by weight of iron based on the weight of the silicon.

6. A method in accordance with claim 2 wherein after the pretreatment of silicon and prior to the reaction with $CH_3Cl$, the silicon is mixed with cuprous chloride.

References Cited in the file of this patent

UNITED STATES PATENTS

| | | |
|---|---|---|
| 1,037,713 | Allen | Sept. 3, 1912 |
| 1,180,968 | Brockbank | Apr. 25, 1916 |
| 2,427,605 | Hurd | Sept. 16, 1947 |
| 2,488,487 | Barry et al. | Nov. 15, 1949 |
| 2,579,341 | Schwenker | Dec. 18, 1951 |
| 2,666,775 | Nitzsche | Jan. 19, 1954 |

FOREIGN PATENTS

| | | |
|---|---|---|
| 681,387 | Great Britain | Oct. 22, 1952 |
| 708,823 | Great Britain | May 12, 1954 |

OTHER REFERENCES

Rochow et al.: "American Chem. Soc., Journal," vol. 67, page 1773 (1945).

Hurd et al.: "Jour. Am. Chem. Soc.," vol. 67 (1945), pages 1057-9.